(12) United States Patent
Kwon et al.

(10) Patent No.: US 11,215,251 B2
(45) Date of Patent: Jan. 4, 2022

(54) BRAKE DISC AND MANUFACTURING METHOD THEREOF

(71) Applicants: HYUNDAI MOTOR COMPANY, Seoul (KR); KIA MOTORS CORPORATION, Seoul (KR)

(72) Inventors: Soon Woo Kwon, Ansan-si (KR); Chung An Lee, Hwaseong-si (KR); Min Woo Kang, Incheon (KR); Seung Hyun Hong, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 219 days.

(21) Appl. No.: 16/534,433

(22) Filed: Aug. 7, 2019

(65) Prior Publication Data

US 2020/0191215 A1    Jun. 18, 2020

(30) Foreign Application Priority Data

Dec. 14, 2018  (KR) .................. 10-2018-0161957

(51) Int. Cl.
*F16D 65/12* (2006.01)
*C23C 4/08* (2016.01)
(Continued)

(52) U.S. Cl.
CPC .............. *F16D 65/127* (2013.01); *C23C 4/08* (2013.01); *C23C 4/12* (2013.01); *C23C 4/18* (2013.01); *C23C 8/02* (2013.01); *C23C 8/26* (2013.01); *F16D 65/125* (2013.01); *F16D 69/027* (2013.01); *F16D 2065/132* (2013.01); *F16D 2069/0475* (2013.01); *F16D 2069/0491* (2013.01); *F16D 2200/0008* (2013.01); *F16D 2200/0013* (2013.01); *F16D 2250/0038* (2013.01); *F16D 2250/0046* (2013.01); *F16D 2250/0053* (2013.01)

(58) Field of Classification Search
CPC .. C23C 4/067; C23C 4/08; C23C 8/04; C23C 8/30; C23C 8/80; F16D 65/125–128
USPC .................... 148/217, 218, 222; 188/218 XL
See application file for complete search history.

(56) References Cited

U.S. PATENT DOCUMENTS 4,024,617 A  *  5/1977  McCormick .............. C23C 4/08
                                                     148/526
5,407,035 A  *  4/1995  Cole ....................... C23C 4/067
                                                     188/218 XL
(Continued)

FOREIGN PATENT DOCUMENTS

CN          102308112 A      1/2012
CN          106011736 A     10/2016
(Continued)

*Primary Examiner* — Christopher P Schwartz
(74) *Attorney, Agent, or Firm* — McDonnell Boehnen Hulbert & Berghoff LLP

(57) ABSTRACT

The present disclosure relates a brake disc and a method of manufacturing the same, in which the depth of the coating layer containing a nitride is adjustable and corrosion resistance and wear resistance can be improved. A brake disc according to an embodiment of the present disclosure includes: a disc base material made of gray cast iron; and a coating layer formed on a surface of the disc base material and including a nitride produced as nitrogen is diffused into a ferrite matrix structure.

11 Claims, 6 Drawing Sheets

(51) Int. Cl.
*C23C 4/18* (2006.01)
*C23C 8/26* (2006.01)
*C23C 8/02* (2006.01)
*F16D 69/02* (2006.01)
*C23C 4/12* (2016.01)
*F16D 69/04* (2006.01)
*F16D 65/02* (2006.01)

(56) References Cited

U.S. PATENT DOCUMENTS

| | | | | |
|---|---|---|---|---|
| 8,771,438 B2 * | 7/2014 | Lee | ............................ | C23C 8/80 |
| | | | | 148/222 |
| 8,877,296 B2 * | 11/2014 | Lembach | .............. | F16D 65/127 |
| | | | | 427/451 |
| 9,541,144 B2 * | 1/2017 | Sugai | ......................... | C23C 8/30 |
| 2005/0025883 A1 * | 2/2005 | Yuan | ....................... | F16D 65/12 |
| | | | | 427/180 |
| 2013/0295375 A1 * | 11/2013 | Ernst | ....................... | C22C 38/22 |
| | | | | 428/332 |
| 2014/0143992 A1 * | 5/2014 | Xiong | ....................... | C23C 8/04 |
| | | | | 29/90.01 |
| 2017/0122392 A1 * | 5/2017 | Lembach | ................ | F16D 69/04 |
| 2020/0182318 A1 * | 6/2020 | Kang | ....................... | C21D 3/04 |

FOREIGN PATENT DOCUMENTS

| | | |
|---|---|---|
| JP | 2000-337410 A | 12/2000 |
| KR | 2004-0067168 A | 7/2004 |
| KR | 10-0791210 B1 | 1/2008 |
| KR | 2009-0111586 A | 10/2009 |
| KR | 10-2013-0023130 A | 3/2013 |
| KR | 10-2013-0121269 A | 11/2013 |

\* cited by examiner

BRAKE DISC AND MANUFACTURING METHOD THEREOF

CROSS REFERENCE TO RELATED APPLICATION

This application claims priority to Korean Patent Application No. 10-2018-0161957, filed on Dec. 14, 2018 in the Korean Intellectual Property Office, the disclosure of which is incorporated herein by reference.

BACKGROUND

1. Field of the Disclosure

The present disclosure relates to a brake disc and a method of manufacturing the same, and more particularly, to a brake disc and a method of manufacturing the same, in which the depth of the coating layer containing a nitride is adjustable and corrosion resistance and wear resistance can be improved.

2. Description of the Prior Art

A brake apparatus is an apparatus for decelerating or stopping a running vehicle or for keeping a stopped vehicle in the stopped state.

The brake apparatus includes a braking force generation device that generates a force necessary for braking, a braking device that decelerates or stops the vehicle using the force generated by the braking force generation device, pipes that transmit the force of the braking force generation device to the braking device, a piston, valves, and an ancillary device for auxiliary power. The braking device is structurally classified into a drum-type brake or a disc-type brake.

Particularly, in the case of a disc-type brake, a brake disc is fixed to each wheel of the vehicle, and the left and right surfaces of the brake disc are provided with a pair of brake pads capable of being pressed against or separated from the surfaces of the brake disc. That is, when the brake pads are brought into close contact with the brake discs rotated together with the wheels, the vehicle is braked through frictional force.

Brake discs are mainly made by casting gray cast iron. The purpose of using gray cast iron mainly for making brake discs is that gray cast iron has advantages such as excellent castability, high thermal conductivity, excellent vibration damping ability, excellent wear resistance, low cost, and so on.

However, when the gray cast iron is not subjected to separate rust prevention treatment, red rust is easily generated on the surface thereof, deteriorating appearance quality, and there is a high possibility of occurrence of a judder phenomenon due to the generation of rust.

In order to suppress rust from being easily generated on the surface of the gray cast iron as described above, nitriding is generally performed on the surface of the brake disc made of gray cast iron. However, there is a problem in that pearlite and graphite, which constitute a matrix structure of gray cast iron, inhibit the diffusion of nitrogen, and due to such a problem, there is a limit to quality improvement in that the depth of the nitride layer produced by the nitriding is shallow and the thickness of the nitride layer is uneven.

FIG. 1 is a photograph showing a conventional brake disc. As shown in FIG. 1, when a nitride layer 20 is directly formed on the surface of a base material 10 formed of gray cast iron, there are problems in that the depth of the nitride layer 20 is shallow and in that graphite (Gr.) formed in the base material 10 is exposed to the outside. The graphite (Gr.) exposed to the outside acts as a point of accelerating corrosion and is still vulnerable to corrosion despite the formation of the nitride layer.

The foregoing description of the background art is provided merely for the purpose of understanding the background of the present disclosure and should not be construed as acknowledging that the conventional art is known to those skilled in the art.

SUMMARY

The present disclosure provides a brake disc and a method of manufacturing the same, in which the depth of a coating layer containing a nitride is adjustable while maintaining the advantages of gray cast iron and the brake disc corrosion resistance and wear resistance can be improved.

A brake disc according to an embodiment of the present disclosure includes a disc base material made of gray cast iron, and a coating layer formed on a surface of the disc base material and including a nitride produced as nitrogen is diffused into a ferrite matrix structure.

The coating layer is formed by burnishing a sprayed layer formed by thermal spraying a coating material including pure iron powder and other unavoidable impurities onto the surface of the disc base material and then nitriding the burnished sprayed layer.

The coating layer includes a nitrogen-diffused region in which nitrogen is diffused through the nitriding, and the nitrogen-diffused region includes a strengthened phase region in which the nitride of at least one of an epsilon ($\varepsilon$) phase and a gamma prime ($\gamma'$) phase is formed.

The strengthened phase region formed in the coating layer may be formed by at least 20 μm from the surface.

The coating material further contains 1 wt % or less of one or more strengthening elements selected from Cr, Al, Ti, and V.

The coating layer includes a strengthening nitride, which is formed by bonding nitrogen with at least one of the strengthening elements.

The coating layer includes a nitrogen-diffused region in which nitrogen is diffused through the nitriding, and the nitrogen-diffused region includes a strengthened phase region in which the nitride of at least one of an epsilon ($\varepsilon$) phase and a gamma prime ($\gamma'$) phase is formed and the strengthening nitride.

Meanwhile, a method of manufacturing a brake disc according to an embodiment of the present disclosure includes: a base-material-providing step of providing a disc base material made of gray cast iron; a thermal spraying step of thermal spraying a coating material containing pure iron powder and other unavoidable impurities onto the surface of the disc base material to form a sprayed layer of a ferrite matrix structure; a burnishing a step of burnishing the sprayed layer; and a nitriding step of nitriding the burnished sprayed layer to form a coating layer on which a nitride is produced.

The nitriding step includes nitriding the burnished sprayed layer from a surface of the burnished sprayed layer to form a nitrogen-diffused region in which a nitride is formed by diffusing nitrogen in all or a part of the burnished sprayed layer, and the nitrogen-diffused region includes a strengthened phase region in which at least one of an epsilon ($\varepsilon$) phase and a gamma prime ($\gamma'$) phase is formed.

The nitriding includes nitriding the burnished sprayed layer from a surface of the burnished sprayed layer to form a nitrogen-diffused region in which a nitride is formed by diffusing nitrogen in all of the burnished sprayed layer.

In the nitriding step, the strengthened phase region is formed at least 20 μm from a surface of the coating layer.

The coating material sprayed in the thermal spraying step further contains 1 wt % or less of one or more strengthening elements selected from Cr, Al, Ti, and V, and the nitriding step includes forming a strengthening nitride, which is formed as the strengthening elements and nitrogen are bonded to each other.

The nitriding includes nitriding the burnished sprayed layer from a surface of the burnished sprayed layer to form a nitrogen-diffused region in which a nitride is formed by diffusing nitrogen in all or a part of the burnished sprayed layer, and the nitrogen-diffused region includes the strengthening nitride.

The thermal spraying step is performed in a reducing atmosphere.

According to the embodiment of the present disclosure, a sprayed layer of a ferrite matrix structure is formed on the surface of a disc base material so as to facilitate diffusion of nitrogen, burnished, and then nitrided to form a coating layer in which a uniform nitride is formed to a desired thickness.

Accordingly, since the coating layer covers the surface of the disc base material made of gray cast iron, it is possible to fundamentally avoid a primary corrosion phenomenon caused by graphite in the gray cast iron, which is vulnerable to corrosion. In addition, as the nitrogen is stably diffused in the coating layer, nitrides composed of an epsilon (ε) phase and a gamma prime (γ') phase are uniformly produced. Thus, improvement in corrosion resistance and wear resistance can be expected.

Particularly, by including elements such as Cr, Al, Ti, and V in pure iron powder forming a coating material when forming a coating layer, high hardness nitrides such as CrN and AlN are also produced during the nitriding. Thus, a further increase in hardness and improvement in wear resistance can be expected.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Hereinafter, embodiments of the present disclosure will be described in more detail with reference to the accompanying drawings. However, the present disclosure is not limited to the following embodiments but may be implemented in various different forms. The embodiments are provided only to complete disclosure of the present disclosure and to fully provide a person ordinarily skill in the art with the category of the disclosure.

Figure 1:
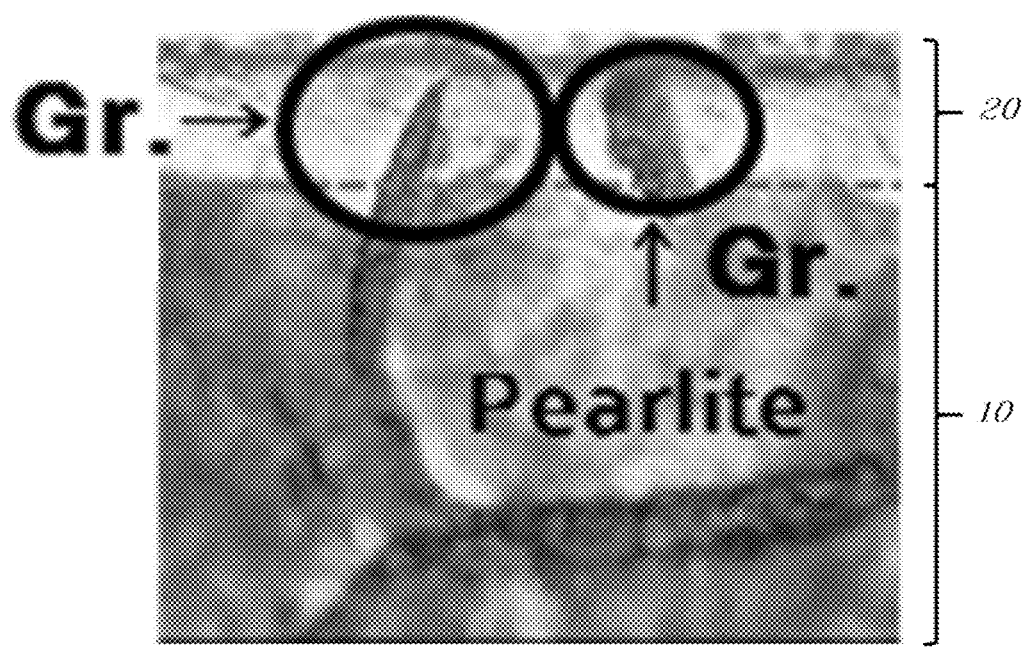
FIG. 1 is a photograph showing a conventional brake disc.
Figure 2:
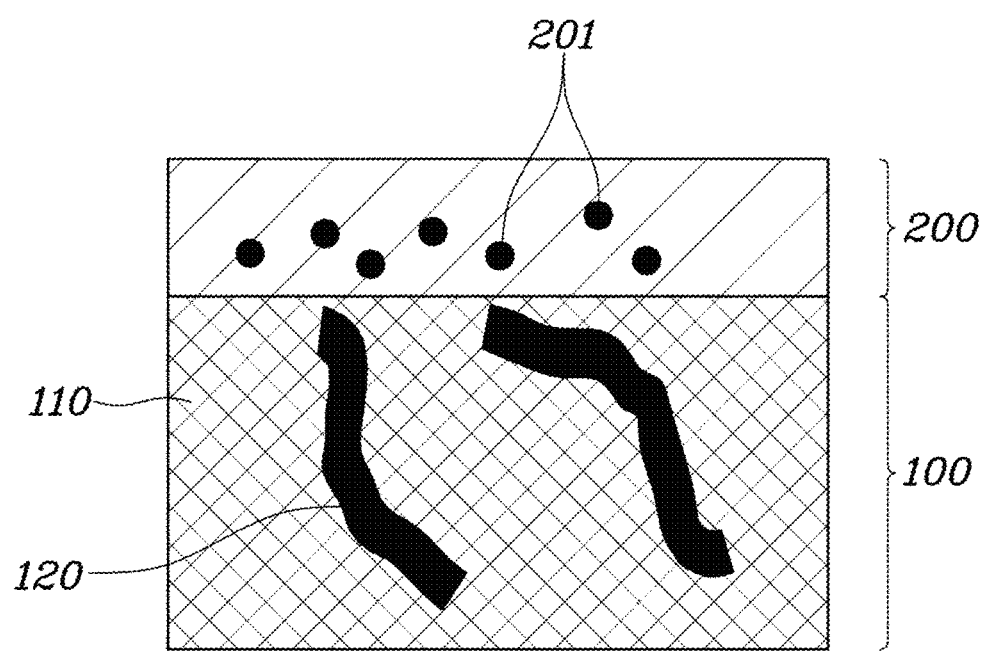
FIG. 2 is a cross-sectional view of a brake disc according to an embodiment of the present disclosure.
Figure 3:
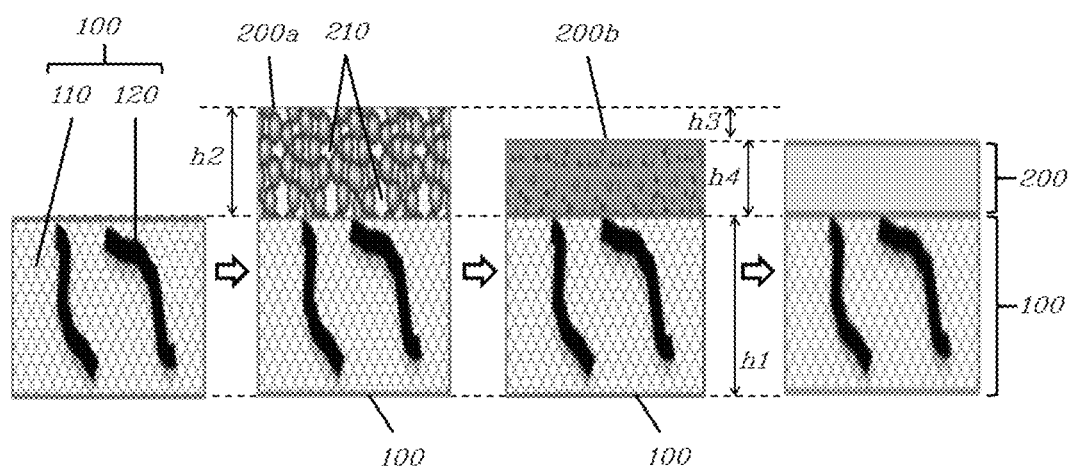
FIG. 3 shows cross-sectional views of a brake disc according to steps of manufacturing a brake disc according to an embodiment of the present disclosure.

FIG. 2 is a cross-sectional view of a brake disc according to an embodiment of the present disclosure, and FIG. 3 shows cross-sectional views of a brake disc according to steps of manufacturing a brake disc according to an embodiment of the present disclosure.

As shown in the drawings, a brake disc according to an embodiment of the present disclosure includes a disc base material 100 made of gray cast iron; and a coating layer 200 formed on the surface of the disc base material 100 and containing a nitride produced due to the diffusion of nitrogen in a ferrite matrix structure formed of pure iron powder.

The disc base material 100 implements the overall shape of the brake disc and is manufactured by casting gray cast iron into a general shape of a brake disc. At this time, steel grades such as FC170, FC200, and FC250 may be used as gray cast iron. Thus, the disc base material 100 includes pearlite 110 and graphite 120.

The coating layer 200 is formed on the surface of the disc base material 100 and protects the disc base material 100. The coating layer 200 is formed by burnishing and then nitriding a sprayed layer 200, which is formed by thermal spraying a coating material made of pure iron powder and other unavoidable impurities onto the surface of the disc base material 100.

The thermal spraying and burnishing are performed before the nitriding in forming the coating layer 200 because the disc base material 100 is formed of gray cast iron, but nitrogen is not diffused smoothly in the gray cast iron in which the matrix structure is formed of pearlite 110 and graphite 120. Thus, thermal spraying and burnishing are performed before nitriding in order to improve the surface of the disc base material 100 to a surface state in which nitrogen is easily diffused before the nitriding of the disc base material 100.

For this purpose, the coating material forming the coating layer 200 uses a coating material containing pure iron and other unavoidable impurities for forming the ferrite matrix structure.

Meanwhile, in the coating layer 200, a nitrogen-diffused region in which nitrogen is diffused through the nitriding may be classified. At this time, the nitrogen-diffused region occupies the entire coating layer 200 or is formed to a predetermined depth from the surface of the coating layer 200 depending on a nitriding degree. Improvement in corrosion resistance and wear resistance can be expected by forming such a nitrogen-diffused region.

Particularly, in the nitrogen-diffused region, a strengthened phase region in which at least one of an epsilon (ε) phase ($Fe_{2-3}N$) and a gamma prime (γ') phase ($Fe_3N$) is formed may also be classified depending on a nitriding degree. By forming such a strengthened phase region, it is expected that the strengthened phase region has better physical properties than the corrosion resistance and wear resistance that can be expected in the nitrogen-diffused region. Thus, the nitrogen-diffused region may be classified into a strengthened phase region in which a nitride in which Fe and N are metallurgically bonded at a specific ratio like the epsilon (ε) phase ($Fe_{2-3}N$) and the gamma prime (γ') is formed and a non-strengthened region in which Fe and N are not metallurgically bonded and N is partially diffused into the ferrite matrix structure.

Meanwhile, the strengthened phase region in which the nitride is formed in the coating layer 200 may vary depending on the thickness of the coating layer and the nitriding conditions. However, it is preferable to form the strengthened phase region to a range of at least 20 μm or more from the surface of the coating layer 200, so that the improvement in corrosion resistance and wear resistance can be expected.

Thus, the coating layer 200 may be divided into a strengthened phase area and a non-strengthened phase region from the surface toward the core portion. Of course, in the region of the coating layer 200 deeper than the non-strengthened phase region in the coating layer 200, by a predetermined thickness, the state of the burnished sprayed layer 200b may be maintained as it is without being nitrided depending on the nitriding conditions.

Thus, the coating layer 200 may be classified into, for example, a region in which nitrides such as an epsilon phase and a gamma prime phase are formed from the surface, a region in which nitrogen is diffused without forming the epsilon phase and the gamma prime phase, and a region in which nitrogen is not diffused and the burnished sprayed layer is maintained as it is.

Accordingly, the nitrogen-diffused region means a region including the strengthened phase region in which the nitrides such as the epsilon phase and the gamma prime phase are formed, and the non-strengthened region in which the epsilon phase and the gamma prime phase are not formed but the nitrogen is diffused. In addition, the coating layer means a region of the burnished sprayed layer including both the strengthened phase region and the non-strengthened image region together with the region in which nitrogen is not diffused.

However, in the case where the burnished sprayed layer 200b is nitrided to form a nitrogen-diffused region, it is preferable to sufficiently perform the nitriding such that the entire burnished sprayed layer 200b is changed to the nitrogen-diffused region. This is because when the burnished sprayed layer 200b remains as it is without being nitrided, the pure iron component forming the burnished sprayed layer 200b is low in hardness, and thus the corresponding portion becomes a weak portion against external force, whereby the coating layer 200 may peel off from the base material 100. Meanwhile, when the coating layer 200 is formed only of a coating material composed of pure iron powder and other unavoidable impurities, the hardness of the coating layer 200 may be lower than that of the disc base material 100, which is made of gray cast iron. Thus, the coating material may further include a strengthening element that induces the formation of a strengthening nitride such that the hardness of the coating layer formed of the pure iron powder can be improved.

For example, one or more elements of Cr, Al, Ti, and V may be used as the strengthening elements. Thus, during the nitriding of the burnished sprayed layer 200b, strengthening nitrides 201, which are formed when the strengthening elements contained in the coating material are bonded with nitrogen, are formed.

Therefore, when the nitriding is performed for the formation of the coating layer 200, fine and highly hard strengthening nitrides 201 of Cr—N, Al—N, Ti—N and V-N series are produced simultaneously with the formation of nitrides by bonding with Fe—N. Thus, further improvement in hardness and wear resistance can be expected.

However, the strengthening elements are contained preferably by 1 wt % or less of the total weight of the coating material. The reason for limiting the strengthening elements to 1 wt % or less is as follows: with the increase of the strengthening elements, although the amount of fine and high hardness strengthening nitrides 201 increases through bonding of the strengthening elements and nitrogen (N) and thus improvement in hardness can be expected, nitrogen (N) consumed in the bonding (compound) with Fe—N is exhausted, and thus the amount of Fe—N compound to be produced is lowered, whereby the depth at which nitrides are produced, that is, the depth of the strengthened phase region becomes shallow.

Next, a method of manufacturing a brake disc formed as described above will be described.

A method of manufacturing a brake disc according to an embodiment of the present disclosure includes: a base-material-providing step of providing a disc base material 100 made of gray cast iron; a thermal spraying step of a coating material containing pure iron powder and other unavoidable impurities onto the surface of the disc base material 100 to form a sprayed layer 200a of a ferrite matrix structure; a burnishing step of burnishing the sprayed layer 200a; and a nitriding step of nitriding the burnished sprayed layer 200b to form a coating layer 200 on which nitride is produced.

The base-material-providing step is a step of providing a disc base material 100 that implements the overall shape of the brake disc, in which the disc base material 100 is fabricated by casting gray cast iron and then machining the cased gray cast iron into a general brake disc shape having a predetermined thickness h1. At this time, steel grades such as FC170, FC200, and FC250 may be used as the gray cast iron.

The thermal spraying step and the burnishing step are pretreatment steps of the nitriding step, which are performed to induce smooth diffusion of nitrogen to the surface of the disc base material 100 in the nitriding step performed subsequent thereto in order to form the nitride to a desired level.

First, the thermal spraying step is a step of forming a matrix structure to smoothly diffuse nitrogen, in which the coating material containing pure iron powder and other unavoidable impurities is sprayed onto the surface of the disc base material 100 to form a sprayed layer 200a of the ferrite matrix structure. At this time, the thermal spraying is preferably performed in a reducing atmosphere in order to inhibit the production of iron oxide. At this time, the thickness h2 of the sprayed layer 200a is preferably thicker than the thickness h4 of the final coating layer 200.

In addition, the coating material used in the thermal spraying step may further include one or more elements (strengthening elements), which induce the formation of strengthening nitrides, such as Cr, Al, Ti and V.

After the thermal spraying step, pores 210 in the sprayed layer 200a are removed, and the burnishing step is performed to lower roughness.

In the burnishing step, the surface of the sprayed layer 200a is physically pressed to apply compressive stress in the sprayed layer 200a, so that the inter-powder pores 210 of the sprayed layer 200a produced in the thermal spraying step can be reduced, the density of the sprayed layer 200a can be increased to improve the compactness, and the roughness can be reduced. In addition, the interface bonding force between the sprayed layer 200a and the disc base material 100 can be increased, and the wear resistance and fatigue resistance can be improved by applying the compressive stress to the sprayed layer 200a.

In addition, by controlling the pressure applied to the surface of the sprayed layer 200a in the burnishing step to compress the thickness of the sprayed layer 200a by a predetermined thickness h3, it is possible to control the thickness h4 of the burnished sprayed layer 200b to the level of the thickness of the coating layer 200, which is desired to be formed on the brake disc, which is the final product.

When the thermal spraying step and the burnishing step are completed, the nitriding step of nitriding the burnished sprayed layer 200b is performed.

The nitriding step is a step of nitriding according to ordinary nitriding conditions, in which nitrogen is diffused into the burnished sprayed layer 200b to produce nitride by metallurgical bond with Fe—N. Thus, a nitrogen-diffused region is formed in the entire burnished sprayed layer 200 or to a predetermined depth from the surface. Improvement in corrosion resistance and wear resistance can be expected by forming such a nitrogen-diffused region.

In the nitriding step, a strengthened phase region is formed in which at least one of an epsilon (ε) phase ($Fe_{2-3}N$) and a gamma prime (γ') phase ($Fe_3N$) is formed depending on a nitriding degree in the nitrogen-diffused region. By the formation of such strengthened phase regions, more improved corrosion resistance and wear resistance can be expected.

Meanwhile, in the nitriding step, it is preferable that the strengthened phase region be formed to at least 20 μm from the surface, so that nitriding can be sufficiently carried out to expect the improvement of corrosion resistance and wear resistance. More preferably, it is preferable to form the strengthened phase region in all of the burnished sprayed layer. This is because, if the burnished sprayed layer remains, it may cause exfoliation due to external force.

In addition, in the nitriding step, by the strengthening elements such as Cr, Al, Ti, and V further added to the coating material, fine and high hardness strengthening nitrides of Cr—N, Al—N, Ti—N, and V-N series are produced, thereby increasing hardness and improving wear resistance. At this time, the strengthening nitrides are formed in the nitrogen-diffused region, preferably in the strengthened phase region.

Next, the present disclosure will be described by comparing embodiments and comparative examples.

In the embodiments, the thermal spraying step, the burnishing step, and the nitriding step according to the present disclosure were sequentially performed on disc base materials prepared by casting gray cast iron. In Embodiment 1, pure iron powder alone was used as a coating material in the thermal spraying step, in Embodiment 2, a coating material containing 1 wt % Cr, which is a strengthening element, in pure iron powder was used in the thermal spraying step.

In Comparative Example 1, only the nitriding step was performed without performing the thermal spraying step and the burnishing step on the disc base material prepared by casting gray cast iron, and in Comparative Examples 2 and 3, the nitriding step was performed after the thermal spraying step and the burnishing step, but in the thermal spraying step, coating materials containing 1.5 wt % and 2.0 wt % Cr in pure iron powder were used.

In addition, in Embodiments 1 and 2 and Comparative Examples 2 and 3, the thicknesses of sprayed layers burnished in the burnishing step were controlled to be 25 μm.

Heat treatment conditions for nitriding were as follows.
Activity of nitrogen: 0.4
Heat treatment temperature x uniformity maintenance time: 580 degrees C. x (1, 2, 5, 10, 20, 30, 40, 50, and 60 hours)

The depths of the nitrides formed in the coating layers were measured for the embodiments and comparative examples prepared as described above, and the results are shown in FIG. 4.

Figure 4:
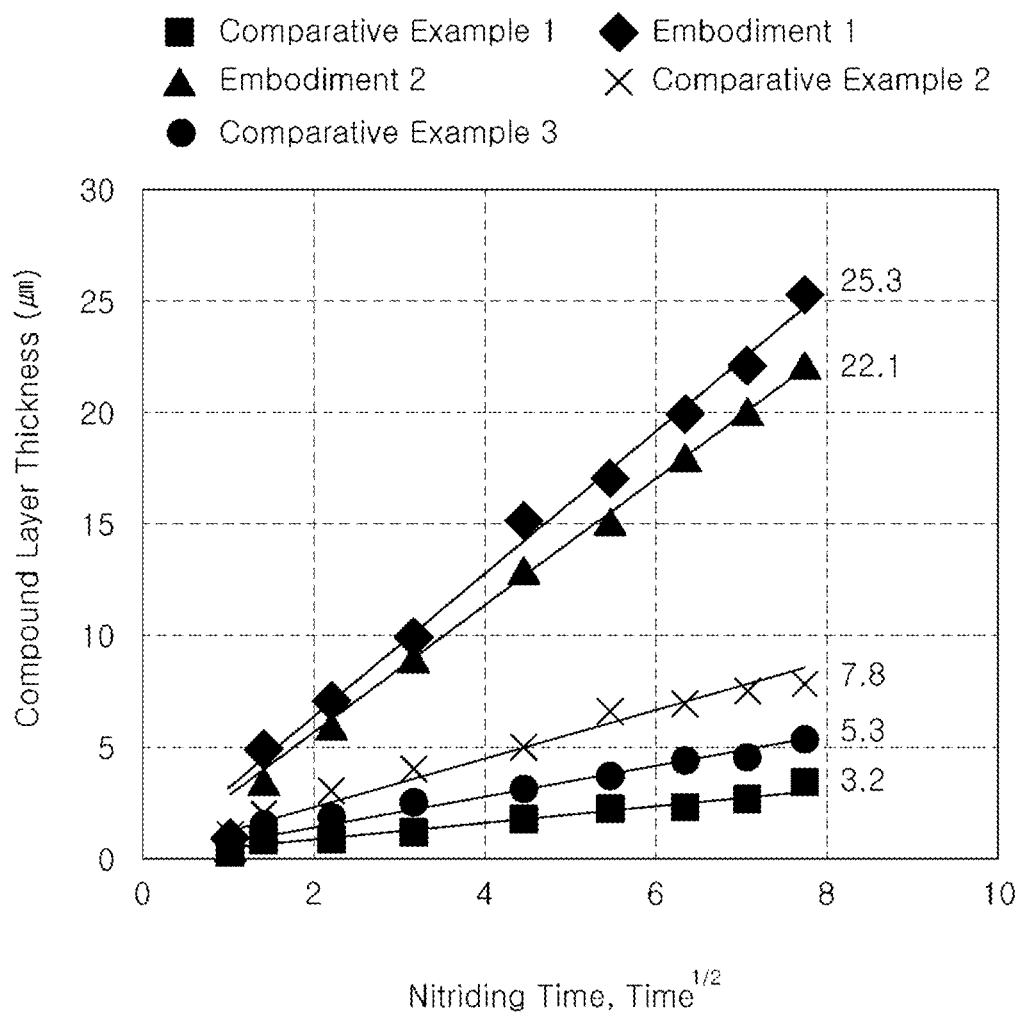
FIG. 4 is a graph comparing the depths at which nitrides are formed on brake discs according to embodiments and comparative examples.

FIG. 4 is a graph comparing the depths at which nitrides were formed in the brake discs according to the embodiments and comparative examples. As shown in FIG. 4, by the nitriding step, in all the embodiments and comparative examples, the thicknesses of the nitrogen-diffused regions in which nitrides were formed were increased proportionally as the nitriding time increased.

However, in the case of Comparative Example 1, the nitrides were not formed smoothly due to insufficient diffusion of nitrogen. In addition, in Comparative Examples 2 and 3, it was confirmed that nitrogen diffused into the disc base materials and the coating layers was exhausted due to excessive formation of fine and high hardness nitrides, and thus generation of the Fe—N series nitrides was reduced and the thickness of the strengthened phase region in which nitrides were formed was reduced.

In contrast, in Embodiments 1 and 2, it was confirmed that the nitrogen was sufficiently diffused into the coating layers, so that the nitrides were produced much more than those in the comparative examples, and the thicknesses of the strengthened phase regions were considerably increased.

Figure 5:
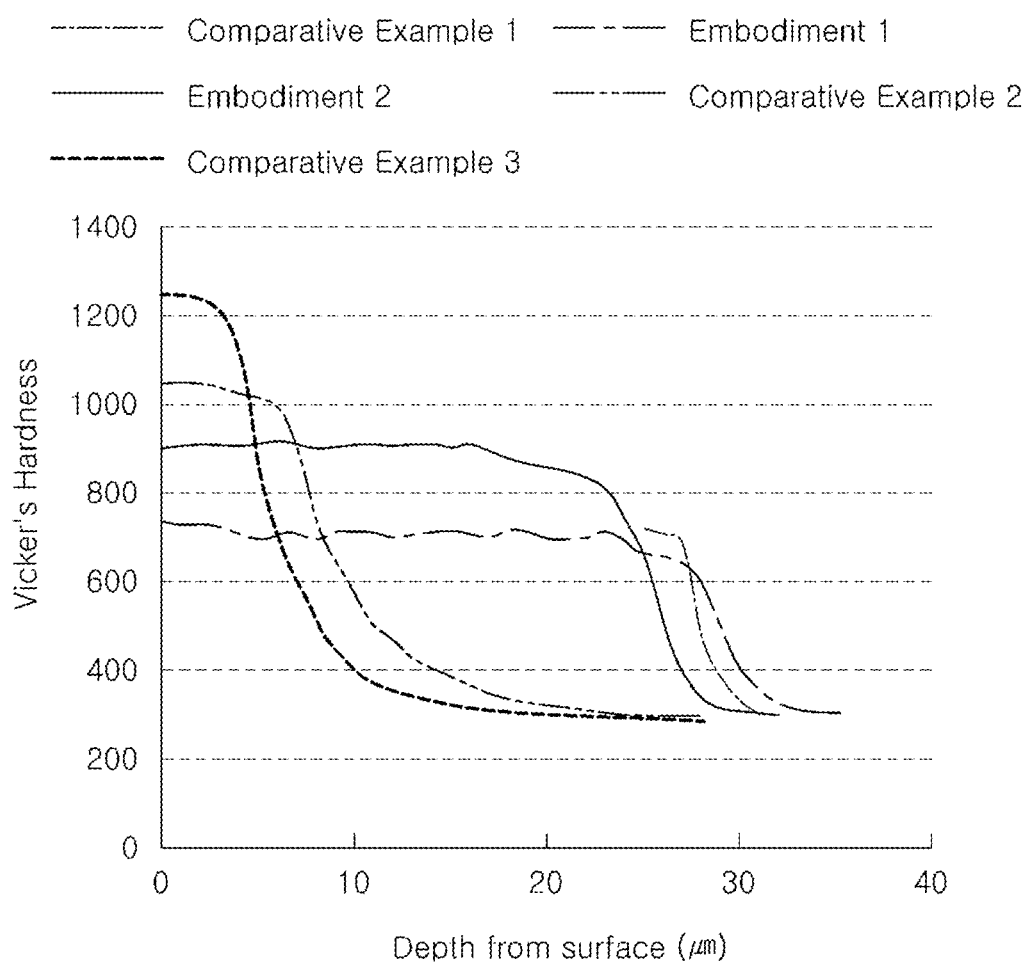
FIG. 5 is a graph comparing surface hardness of brake discs according to embodiments and comparative examples.

Next, surface hardness was measured for the embodiments and comparative examples, and the results are shown in FIG. 5. At this time, the heat treatment time for nitriding was maintained at 60 hours.

FIG. 5 is a graph comparing surface hardness of brake discs according to embodiments and comparative examples. In Comparative Example 1, no coating layer was formed in contrast to the fact that the coating layers were formed in the comparative examples and embodiments. Therefore, the hardness of Comparative Example 1 was measured from the surface of the disc base material toward the core portion. In order to express the depth from the surface in FIG. 5, Comparative Example 1 shows the hardness from a point of 25 μm in consideration of the positions relative to the other comparative examples and embodiments.

In the Embodiments 1 and 2, hardness was maintained at the levels similar to those in Comparative Example 1 or exhibited further improved hardness compared to those in Comparative Example 1. Particularly, in Embodiments 1 and 2, it was confirmed that nitrides were uniformly formed in most regions in the thickness direction of the coating layers, and relatively uniform hardness was secured from the surface of the coating layer to the disc base material.

However, In Comparative Examples 2 and 3, it was confirmed that the hardness was remarkably improved at the surfaces of the coating layers, but the diffusion of nitrogen was insufficient toward the inner direction and the hardness was remarkably lowered.

Figure 6:
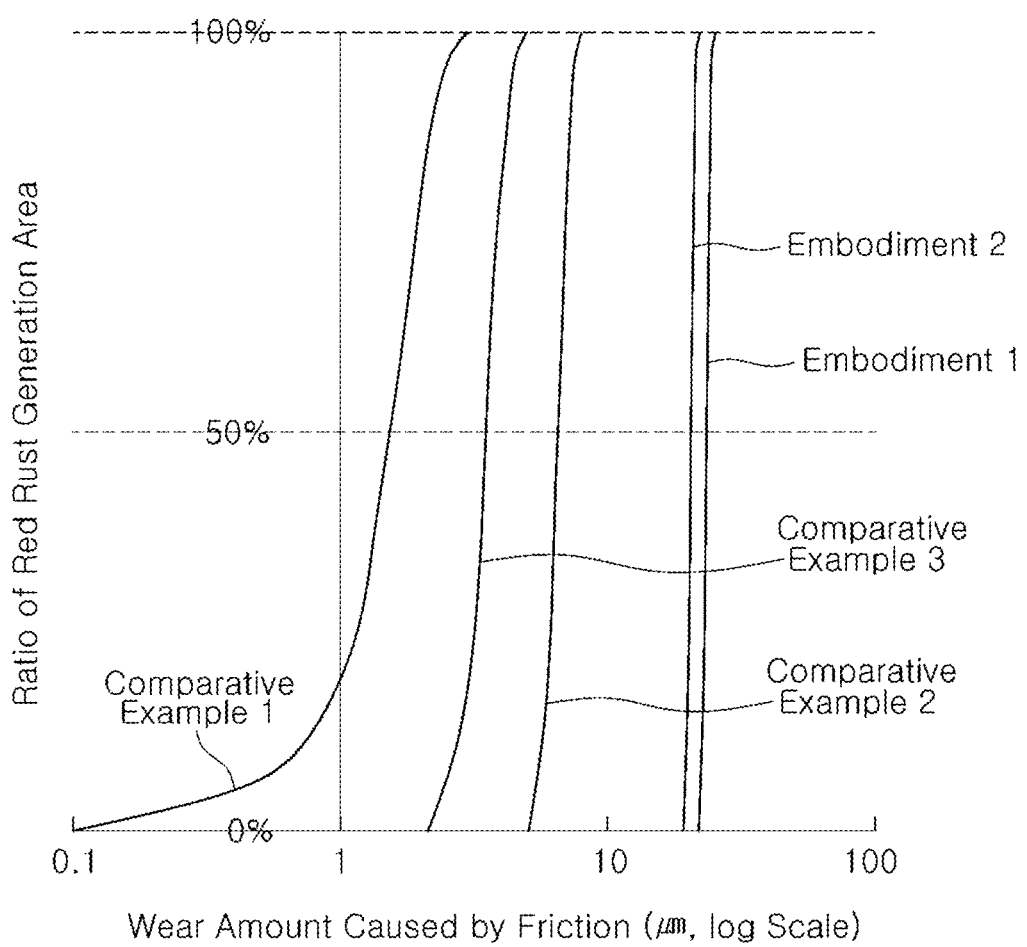
FIG. 6 is a graph showing the results of a salt water spray test of brake discs according to embodiments and comparative examples.

Next, the comparative example and embodiments were subjected to a salt water spray test for evaluating corrosion resistance, and the results are shown in FIG. 6. At this time, the heat treatment time for nitriding was maintained at 60 hours. The salt water spray test was carried out using an evaluation method according to MS630-01.

FIG. 6 is a graph showing the results of a salt water spray test of brake discs according to embodiments and comparative embodiments. The graph shows ratios of areas in which red rust was generated when the surfaces of the brake discs were artificially abraded and worn and sprayed with salt water in the comparative examples and embodiments. The horizontal axis represents the amount of a wear loss in the comparative examples and embodiments.

As can be seen from FIG. 6, it was confirmed that the red rust-generating times in Embodiments 1 and 2 were later than that in the comparative examples. From this result, it can be deduced that the deeper the formation depth of nitride was, the more delayed the point at which the red rust was generated.

Although the present disclosure has been described with reference to the accompanying drawings and the embodiments, the present disclosure is not limited thereto, but is limited only by the following claims. Accordingly, a person ordinarily skilled in the art will appreciate that various modifications and changes can be made thereto without departing from the technical spirit and scope of the following claims.

The invention claimed is:

1. A brake disc comprising:
a disc base material made of gray cast iron; and
a coating layer formed on a surface of the disc base material and including a nitride produced as nitrogen is diffused into a ferrite matrix structure;
wherein the coating layer is formed by burnishing a sprayed layer formed by thermal spraying a coating material including pure iron powder and other unavoidable impurities onto the surface of the disc base material and then nitriding the burnished sprayed layer; and
wherein the coating material further contains 1 wt % or less of one or more strengthening elements selected from Cr, Al, Ti, and V.

2. The brake disc of claim 1, wherein the coating layer includes a nitrogen-diffused region in which nitrogen is diffused through the nitriding, and
the nitrogen-diffused region includes a strengthened phase region in which the nitride of at least one of an epsilon (ε) phase and a gamma prime (γ') phase is formed.

3. The brake disc of claim 2, wherein the strengthened phase region formed in the coating layer is formed by at least 20 μm from the surface.

4. The brake disc of claim 1, wherein the coating layer includes a strengthening nitride, which is formed by bonding nitrogen with at least one of the strengthening elements.

5. The brake disc of claim 4, wherein the coating layer includes a nitrogen-diffused region in which nitrogen is diffused through the nitriding, and
the nitrogen-diffused region includes a strengthened phase region in which the nitride of at least one of an epsilon (ε) phase and a gamma prime (γ') phase is formed.

6. A method of manufacturing a brake disc, the method comprising:
providing a disc base material made of gray cast iron;
thermal spraying a coating material containing pure iron powder and other unavoidable impurities onto the surface of the disc base material to form a sprayed layer of a ferrite matrix structure;
burnishing the sprayed layer; and
nitriding the burnished sprayed layer to form a coating layer on which a nitride is produced;
wherein the coating material sprayed in the thermal spraying further contains 1 wt % or less of one or more strengthening elements selected from Cr, Al, Ti, and V; and
the nitriding includes forming a strengthening nitride, which is formed by bonding nitrogen with at least one of the strengthening elements, in the coating layer.

7. The method of claim 6, wherein the nitriding includes nitriding the burnished sprayed layer from a surface of the burnished sprayed layer to form a nitrogen-diffused region in which a nitride is formed by diffusing nitrogen in all or a part of the burnished sprayed layer, and
the nitrogen-diffused region includes a strengthened phase region in which at least one of an epsilon (ε) phase and a gamma prime (γ') phase is formed.

8. The method of claim 7, wherein the nitriding includes nitriding the burnished sprayed layer from a surface of the burnished sprayed layer to form a nitrogen-diffused region in which a nitride is formed by diffusing nitrogen in all of the burnished sprayed layer.

9. The method of claim 7, wherein in the nitriding, the strengthened phase region is formed at least 20 μm from a surface of the coating layer.

10. The method of claim 6, wherein the nitriding includes nitriding the burnished sprayed layer from a surface of the burnished sprayed layer to form a nitrogen-diffused region in which a nitride is formed by diffusing nitrogen in all or a part of the burnished sprayed layer, and
the nitrogen-diffused region includes the strengthening nitride.

11. The method of claim 6, wherein the thermal spraying is performed in a reducing atmosphere.

* * * * *